(12) United States Patent
Bacon et al.

(10) Patent No.: US 7,997,369 B2
(45) Date of Patent: Aug. 16, 2011

(54) ARTICULATING CAB ASSEMBLY FOR EXCAVATOR

(75) Inventors: Bruce E. Bacon, Duluth, MN (US); Adam J. Bennis, Superior, WI (US)

(73) Assignee: Exodus Machines, Inc., Superior, WI (US)

( * ) Notice: Subject to any disclaimer, the term of this patent is extended or adjusted under 35 U.S.C. 154(b) by 170 days.

(21) Appl. No.: 12/476,882

(22) Filed: Jun. 2, 2009

(65) Prior Publication Data

US 2010/0300786 A1    Dec. 2, 2010

(51) Int. Cl.
    *B62D 33/063*    (2006.01)
(52) U.S. Cl. .................. 180/89.13; 296/190.04
(58) Field of Classification Search ........... 180/89.12, 180/89.13, 89.14, 89.15; 296/190.01, 190.04, 296/190.05
    See application file for complete search history.

(56) References Cited

U.S. PATENT DOCUMENTS

| | | | |
|---|---|---|---|
| 2,815,250 A * | 12/1957 | Thornton-Trump | ........... 182/2.8 |
| 3,721,077 A | 3/1973 | van Der Lely | |
| 3,891,264 A * | 6/1975 | Hunter et al. | ............ 296/190.04 |
| 4,421,188 A | 12/1983 | Fredriksen | |
| 4,427,090 A | 1/1984 | Fredriksen et al. | |
| 4,436,169 A | 3/1984 | Jennerjohn et al. | |
| 4,511,015 A * | 4/1985 | Purdy | ........................... 182/2.11 |
| 4,995,469 A | 2/1991 | Mikkelsen et al. | |
| 5,865,264 A | 2/1999 | Glass et al. | |
| 5,890,557 A * | 4/1999 | Glass et al. | ................. 180/89.13 |
| 6,401,368 B1 | 6/2002 | McLeod et al. | |
| 6,488,161 B1 * | 12/2002 | Bean | ............................. 212/300 |
| 7,204,546 B2 | 4/2007 | Antonetti | |
| 7,419,023 B2 * | 9/2008 | Mieger | ....................... 180/89.13 |

FOREIGN PATENT DOCUMENTS

EP    0 960 982 A2    12/1999

* cited by examiner

*Primary Examiner* — Paul N Dickson
*Assistant Examiner* — Drew Brown
(74) *Attorney, Agent, or Firm* — Gerald E. Helget; Nelson R. Capes; Briggs and Morgan, P.A.

(57) ABSTRACT

An articulating cab assembly for vehicles with an elevated frame, such as excavators, is described. The cab assembly includes a cab coupled to a pivot plate, wherein the pivot plate is coupled to a cab assembly mounting framework. A cab extendable link is pivotally connected to the cab and the pivot plate, for moving the cab between an elevated operating position and a lower ground level operator load and unload access position. The cab assembly also includes a framework extendable link that is pivotally connected to the pivot plate and to the cab assembly mounting framework, for moving the pivot plate forwardly and rearwardly without pivot plate rotation. The cab is in a fully lowered position when the extendable links are each at a minimum extension, and the cab is in a fully raised position when the extendable links are each at a maximum extension.

25 Claims, 6 Drawing Sheets

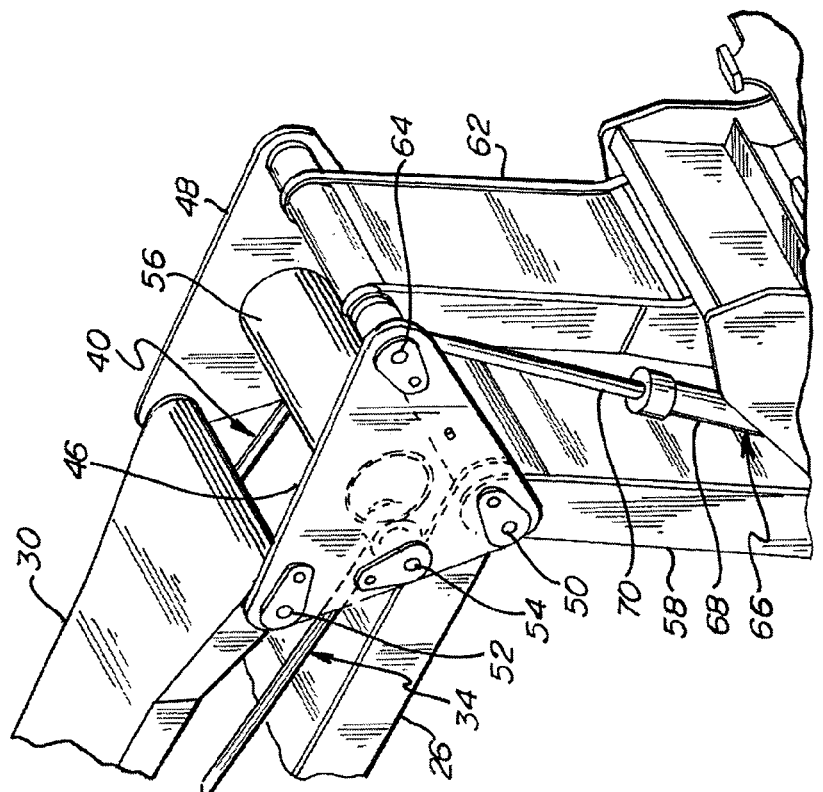
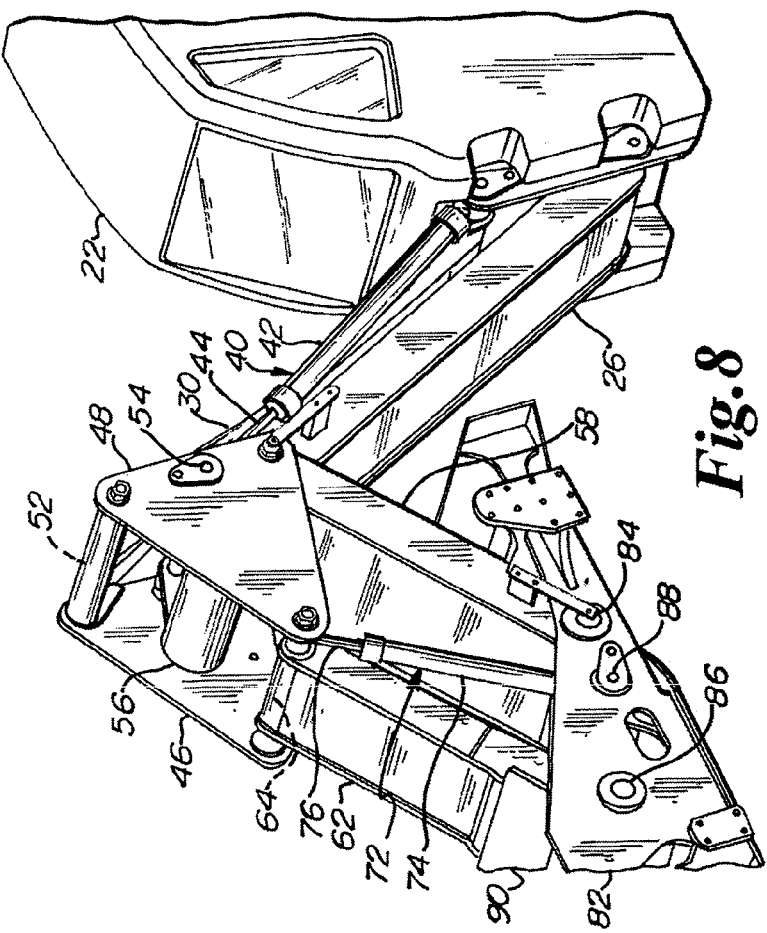
Fig. 9
Fig. 8

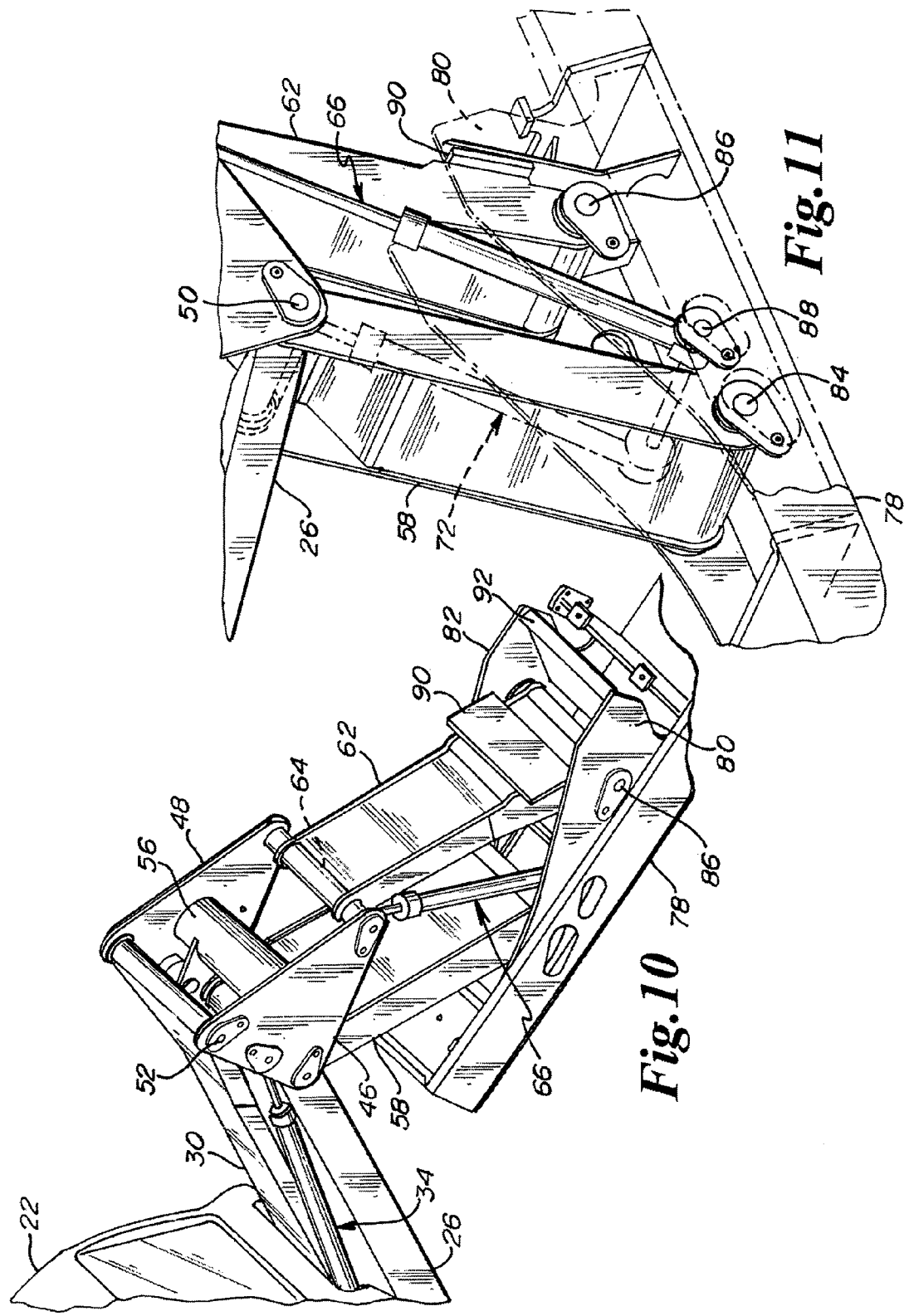

ARTICULATING CAB ASSEMBLY FOR EXCAVATOR

BACKGROUND OF THE INVENTION

Many engineering vehicles, such as excavators, backhoes, and cranes, include an elevated cab. These elevated cabs are frequently positioned at a significant distance from ground level. Due to the difficulty of climbing into or out of elevated cabs, falling from engineering vehicles in the process of cab entry or exit is a common cause of injury to equipment operators.

Cab assemblies have been designed which allow a vehicle cab to be moved into different positions. Some of these cab assemblies, while enabling the cab to be moved from one operating position to another, are not designed to lower the cab to a position at or near ground level. For example, U.S. Pat. No. 4,427,090 describes a cab assembly which moves a cab between two supporting plates that are each mounted on a vehicle chassis. U.S. Pat. No. 5,890,557 describes a cab assembly which enables a cab to be lowered to rest on a pedestal on the chassis of a tractor. Neither of those cab assemblies allows a cab to articulate to a ground level access position.

An example of a cab assembly that enables a cab to be lowered to a ground level position is depicted in U.S. Pat. No. 3,891,264. The cab assembly is mounted to the side of the vehicle. The cab is lifted by the retraction of hydraulic cylinders, which causes rocker arms to pivot rearwardly, thereby lifting the cab. The cab may be moved upwardly and downwardly along the side of the vehicle body, and may pivot around a corner of the vehicle body. The cab may not be lifted to a position in which the cab, or a portion of the cab, is lifted directly above the elevated frame of the vehicle.

Another example of a movable cab assembly is depicted in U.S. Pat. No. 7,419,023. This cab assembly utilizes a telescopic boom to lower the cab from an elevated position. A cab support extends underneath the cab, limiting how close to the ground the cab itself may be positioned.

A need exists for a cab assembly which is able to lower a cab safely to ground level, while also enabling the cab to be moved between a range of operating positions that may improve the operator's vantage point.

SUMMARY OF THE INVENTION

The present invention is directed to an articulating/movable cab assembly for a vehicle with an elevated frame, such as an excavator, backhoe, or crane. The articulating cab assembly is designed to allow the cab of the vehicle to articulate to a position at or near ground level. The movement of the cab is directed by controls operated from within the cab.

When an excavator includes an articulating cab assembly in accordance with the present invention, the operator of the excavator may enter the cab when the cab is in a lowered position at or near ground level. A lowered cab position at or near ground level is also referred to herein as a ground level operator load and unload access position, or a ground level access position. The cab may then be lifted into a raised position, and maintained in the raised position during the operation of the excavator. A raised cab position from which the excavator may be operated is also referred to herein as an elevated operating position. When the operator needs to exit the cab, the cab may be lowered so that it is again in the ground level access position. The ability of the cab to articulate to a ground level access position allows the operator of the excavator to safely enter and exit the cab, without the risks associated with climbing into or out of a cab positioned well above the ground.

The present invention is directed to an articulating cab assembly including a cab coupled to a pivot plate, wherein the pivot plate is coupled to a cab assembly mounting framework. The articulating cab assembly includes a cab extendable link having a first end and a second end, wherein the first end of the cab extendable link is pivotally connected to the cab, and the second end of the cab extendable link is pivotally connected to the pivot plate. The cab assembly also includes a framework extendable link having a first end and a second end, wherein the first end of the framework extendable link is pivotally connected to the pivot plate, and the second end of the framework extendable link is pivotally connected to the cab assembly mounting framework. The cab of this cab assembly is movable between a fully lowered position, which is one ground level access position, and a fully raised position, which is one elevated operating position. When the cab extendable link and the framework extendable link are each at a minimum extension, the cab is in the fully lowered position. When the cab extendable link and the framework extendable link are each at a maximum extension, the cab is in the fully raised position.

In some embodiments, the articulating cab assembly of the present invention may include more than one pivot plate, cab extendable link, and/or framework extendable link. For example, in one embodiment, the articulating cab assembly includes a pair of pivot plates coupled to a cab, wherein the pair of pivot plates is coupled to a cab assembly mounting framework. The articulating cab assembly includes a pair of cab extendable links, wherein each cab extendable link has a first end and a second end. The first end of each cab extendable link is pivotally connected to the cab, and the second end of each cab extendable link is pivotally connected to the pair of pivot plates. The cab assembly also includes a pair of framework extendable links, wherein each framework extendable link has a first end and a second end. The first end of each framework extendable link is pivotally connected to the pair of pivot plates, and the second end of each framework extendable link is pivotally connected to the cab assembly mounting framework. The cab of this cab assembly is movable between a fully lowered position and a fully raised position. When the cab hydraulic cylinders and the framework hydraulic cylinders are each at a minimum extension, the cab is in the fully lowered position. When the cab hydraulic cylinders and the framework hydraulic cylinders are each at a maximum extension, the cab is in the fully raised position.

The present invention is also directed to an articulating cab assembly including a cab assembly mounting framework fixedly mounted to the elevated frame of an excavator, backhoe, or crane. Upwardly extending lower and upper framework links are pivotally mounted to the framework and to a pivot plate, and a framework extendable link is also pivotally mounted to the framework and to the pivot plate. The lower and upper framework links extend upwardly from the framework. Upwardly and downwardly extending lower and upper cab links are pivotally mounted to the pivot plate and to a rear portion of a cab, and a cab extendable link is also pivotally mounted to the pivot plate and to the rear portion of the cab. The upwardly and downwardly extending lower and upper cab links may extend either upwardly or downwardly from the pivot plate, depending on the length to which the cab extendable link is extended. The framework extendable link moves the pivot plate forwardly and rearwardly without pivot plate rotation. The cab extendable link moves the cab between an elevated operating position and a lower ground level operator load and unload access position.

An object and advantage of the present invention is a cab assembly that allows a cab to be safely lowered to a ground level access position.

Another object and advantage of the present invention is a cab assembly that allows a cab to be moved between a range of operating positions that may improve the operator's vantage point.

Another object and advantage of the present invention is a cab assembly that allows a cab to be moved between a range of operating positions without tilting the base of the cab.

Another object and advantage of the present invention is a cab assembly with a safety mechanism that allows the cab to be lowered from an elevated position, even when the engine of the vehicle is not operating.

Other advantages will be understood from reading the Detailed Description of the Preferred Embodiments.

The foregoing has outlined rather broadly the features and technical advantages of the present invention in order that the detailed description of the invention that follows may be better understood. Additional features of the invention which form the subject of the claims of the invention will be described hereinafter. It should be appreciated by those skilled in the art that the specific embodiments disclosed may be readily utilized as a basis for modifying or designing other methods or structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

FIG. 8 is a perspective view of a portion of the cab assembly of FIG. 2, showing the rear of the cab, the pair of pivot plates, a portion of a cab assembly mounting framework, and the links connected to the rear of the cab and to the pivot plates.

FIG. 9 is a perspective view of a portion of the cab assembly of FIG. 2, showing the pair of pivot plates and portions of the links connected to the pivot plates.

FIG. 10 is a perspective view of a portion of the cab assembly of FIG. 2, showing the pair of pivot plates, portions of the rear of the cab and the cab assembly mounting framework, and the links connected to the pivot plates.

FIG. 11 is a perspective view of a portion of the cab assembly of FIG. 2, showing a portion of the cab assembly mounting framework and the links connected to the mounting framework.

DETAILED DESCRIPTION OF THE PREFERRED EMBODIMENTS

The present invention is directed to an articulating/movable cab assembly for a vehicle with an elevated frame. For example, the articulating cab assembly may be mounted on the elevated frame of a vehicle such as an excavator, backhoe, or crane. The articulating cab assembly is designed to allow the cab of the vehicle to move between an elevated operating position and a lower ground level access position.

Figure 1:
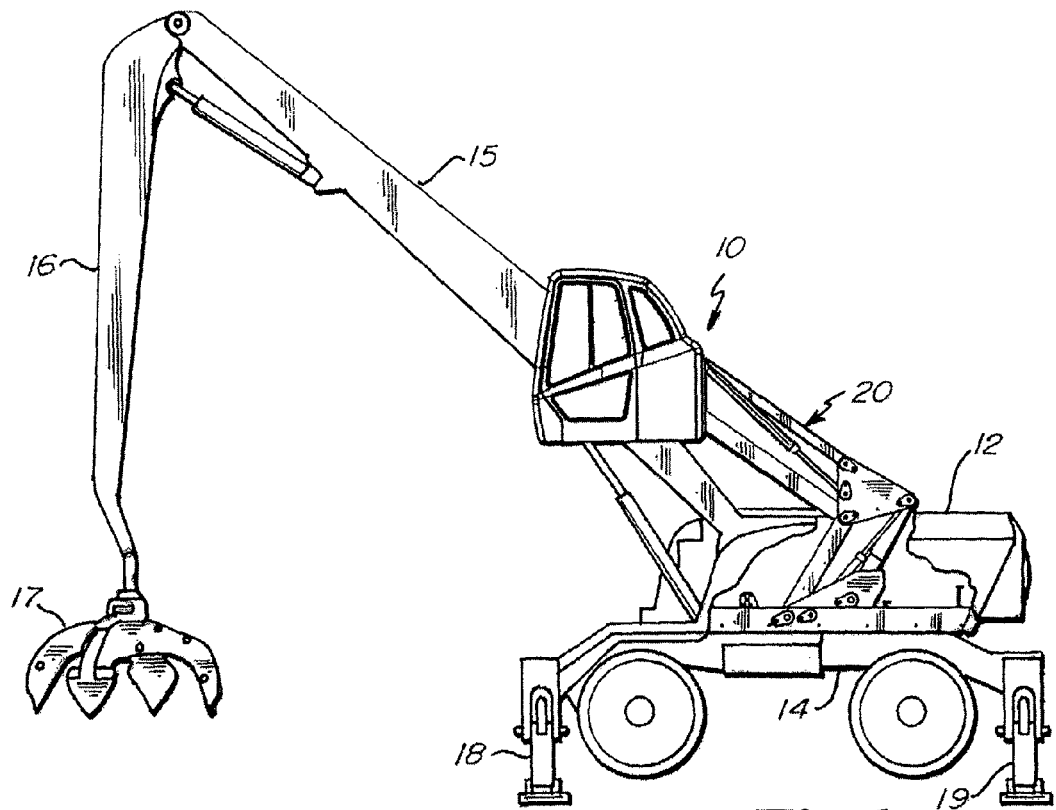
FIG. 1 is a side elevational view of an embodiment of an articulating cab assembly made in accordance with the present invention, wherein the cab assembly is attached to the body of an excavator. The cab of the cab assembly is depicted in a fully raised position.

Referring to FIG. 1, the excavator/backhoe/crane 10 has an elevated frame which includes an upper rotating platform 12 and a supporting undercarriage 14. The excavator 10 also includes a boom 15 and stick 16. A claw tool 17, which is illustratively a grapple, is attached at the end of the stick 16. The excavator 10 is stabilized by stabilization feet 18, 19. The excavator 10 also includes an articulating cab assembly 20 which is mounted on the upper rotating platform 12.

As shown in FIGS. 2-5, an embodiment of the articulating cab assembly 20 includes a cab 22 and an articulated arm 24. Details of the articulating cab assembly 20 are shown in FIGS. 3-12. The articulated arm 24 includes a lower cab stabilizing boom link 26, which is connected to the rear of the cab 22 by a lower cab link-cab pivot pin 28, and an upper cab stabilizing boom link 30, which is connected to the rear of the cab 22 by an upper cab link-cab pivot pin 32. The lower cab link 26 is substantially parallel to the upper cab link 30. While wide stabilizing boom links are used as the cab links 26, 30 in the embodiment shown in FIGS. 1-12, one or more narrower links may be used in place of the stabilizing boom links in some embodiments.

The articulated arm 24 also includes a first cab hydraulic cylinder 34, which has a housing 36 and a piston rod/ram 38, and a second cab hydraulic cylinder 40, which has a housing 42 and a piston rod/ram 44. The first cab hydraulic cylinder 34 is located substantially parallel to the second cab hydraulic cylinder 40. The first cab hydraulic cylinder 34 is shown in FIGS. 1-7. The second cab hydraulic cylinder 40 is located at the opposite side of the cab assembly 20 from first hydraulic cab cylinder 34, and is shown in FIG. 8. While cab hydraulic cylinders 34, 40 are used as extendable links in the embodiment shown in FIGS. 1-12, other extendable links, such as mechanical or electromechanical linear actuators, may be used in place of the hydraulic cylinders.

The first cab hydraulic cylinder 34 and the second cab hydraulic cylinder 40 are connected to the rear of the cab 22 by the upper cab link-cab pivot pin 32, which is the same pivot pin that connects the upper cab link 30 to the rear of the cab 22. The pivot pins are secured to the rear portion of the cab by means known in the art. Along the upper cab link-cab pivot pin 32, the upper cab link 30 is located between the first cab hydraulic cylinder 34 and the second cab hydraulic cylinder 40.

The articulated arm 24 also includes a first triangular pivot plate 46 and a second triangular pivot plate 48. In other embodiments of the cab assembly, pivot plates other than triangular pivot plates, such as square or circular pivot plates, may be used. The two triangular pivot plates are located substantially parallel to each other. The first pivot plate 46 is shown in FIGS. 1-5 and 7. The second pivot plate 48 is located at the opposite side of the cab assembly 20 from the first pivot plate 46, and is shown in FIG. 8. The lower cab link 26, the upper cab link 30, the first cab hydraulic cylinder 34, and the second cab hydraulic cylinder 40 are pivotally connected to the first pivot plate 46 and second pivot plate 48. These links and hydraulic cylinders are connected to the pivot plates 46, 48 at the ends of the links and hydraulic cylinders opposite to the ends that are connected to the rear of the cab 22. Lower cab link 26 is connected to pivot plates 46, 48 by a lower cab link-pivot plate pivot pin 50. Upper cab link 30 is connected to pivot plates 46, 48 by an upper cab link-pivot plate pivot pin 52. The first cab hydraulic cylinder 34 and the second cab hydraulic cylinder 40 are connected to the pivot plates 46, 48 by a cab hydraulic cylinder-pivot plate pivot pin 54. A pivot plate tie beam 56 is located between first pivot plate 46 and second pivot plate 48. Tie beam 56 is cylindrical in shape, but may a tie beam of a different shape may be used in other embodiments. Each end of the cylinder of tie beam 56 is secured to an inner side of pivot plates 46, 48. For example, the tie beam 56 may be welded to the pivot plates 46, 48. The tie beam 56 aids in preventing the pivot plates 46, 48 from moving in relation to each other. Brackets extending from tie beam 56 help to prevent the cab hydraulic cylinders 34, 40 from moving from side to side along the pivot pin 54.

Figure 7:
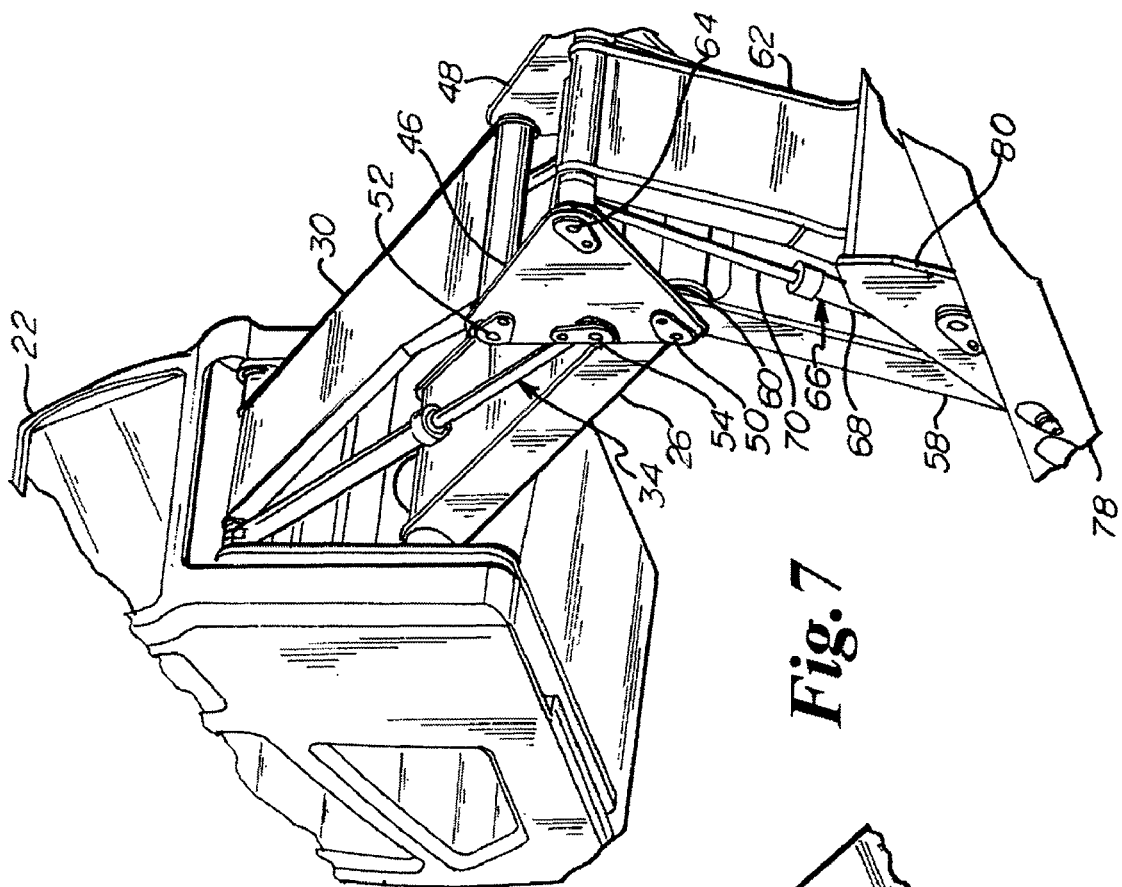
FIG. 7 is a perspective view of a portion of the cab assembly of FIG. 2, showing the rear of the cab, the pair of pivot plates, and the links connected to the rear of the cab and to the pivot plates.
Figure 6:
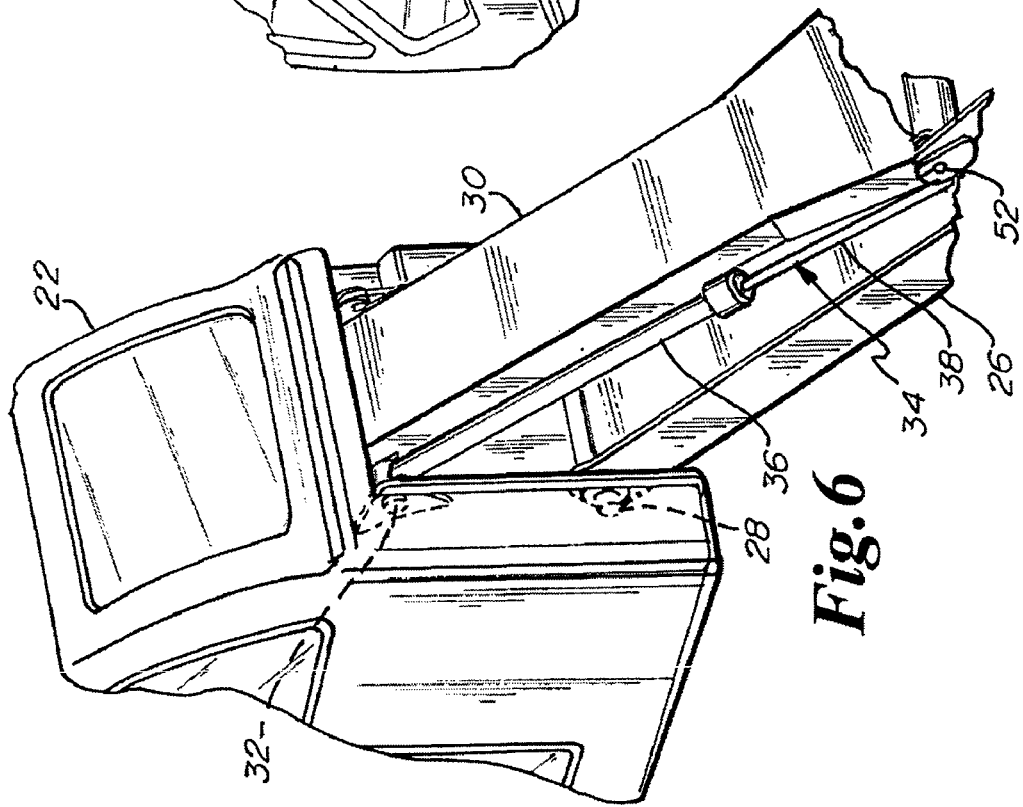
FIG. 6 is a perspective view of a portion of the cab assembly of FIG. 2, showing the rear of the cab and portions of the links connected to the rear of the cab.

The articulated arm 24 also includes a lower framework stabilizing boom link 58, which is connected to pivot plates 46, 48 by the lower cab link-pivot plate pivot pin 50. The pivot pin 50 is the same pivot pin that secures the lower cab boom link 26 to the pivot plates 46, 48. As shown in FIG. 7, a first ear 60 extends from lower framework link 58 at the end of the lower framework link proximate to pivot plates 46, 48. Although FIG. 7 only shows the first ear 60, which is proximate to pivot plate 46, a second ear corresponding to ear 60 is located at the opposite side of the lower framework link 58, proximate to pivot plate 48. Pivot pin 50 extends through the first ear 60 of lower framework link 58, through the end of lower cab link 26, and through the second ear of the lower framework link 58. Therefore, along pivot pin 50, an ear of lower framework link 58 is located at either side of the lower cab link 26.

The articulated arm 24 further includes an upper framework stabilizing boom link 62, which is substantially parallel to lower framework link 58. Upper framework link 62 is connected to pivot plates 46, 48 by an upper framework link-pivot plate pivot pin 64.

While wide stabilizing boom links are used as the framework links 58, 62 in the embodiment shown in FIGS. 1-12, one or more narrower links may be used in place of the stabilizing boom links in some embodiments.

The articulated arm 24 also includes a first framework hydraulic cylinder 66, which has a housing 68 and a piston rod/ram 70, and a second framework hydraulic cylinder 72, which has a housing 74 and a piston rod/ram 76. The first framework hydraulic cylinder 66 is located substantially parallel to the second framework hydraulic cylinder 72. The first framework hydraulic cylinder 66 is shown in FIGS. 1-7. The second framework hydraulic cylinder 72 is located at the opposite side of the cab assembly 20 from first framework hydraulic cylinder 66, and is shown in FIG. 8. While framework hydraulic cylinders 66, 72 are used as extendable links in the embodiment shown in FIGS. 1-12, other extendable links, such as mechanical or electromechanical linear actuators, may be used in place of the hydraulic cylinders.

The first framework hydraulic cylinder 66 and the second framework hydraulic cylinder 72 are connected to the pivot plates 46, 48 by the upper framework link-pivot plate pivot pin 64, which is the same pivot pin that connects the upper framework link 62 to the pivot plates 46, 48. Along the upper framework link-pivot plate pivot pin 64, the upper framework link 62 is located between the first framework hydraulic cylinder 66 and the second framework hydraulic cylinder 72.

Besides the cab 22 and articulated arm 24, the articulating cab assembly 20 also includes a cab assembly mounting framework 78, which is fixedly mounted to the elevated frame of the excavator 10. The mounting framework 78 is preferably mounted to the upper rotating platform 12 of the excavator. The mounting framework 78 includes a first ear 80 and a second ear 82. The ears 80, 82 are substantially parallel. The first ear 80 is shown in FIGS. 1-5 and 7. The second ear 82 is located at the opposite side of the cab assembly 20 from first ear 80, and is shown in FIG. 8. Lower framework link 58 is connected to mounting framework 78 by lower framework link-framework pivot pin 84. Upper framework link 62 is connected to mounting framework 78 by upper framework link-framework pivot pin 86. First framework hydraulic cylinder 66 and second framework hydraulic cylinder 72 are connected to mounting framework 78 by framework hydraulic cylinder-framework pivot pin 88. Brackets located on pivot pin 88, as shown in FIG. 11, help to prevent the framework hydraulic cylinders 70, 76 from moving from side to side along the pivot pin 88.

Figure 12:
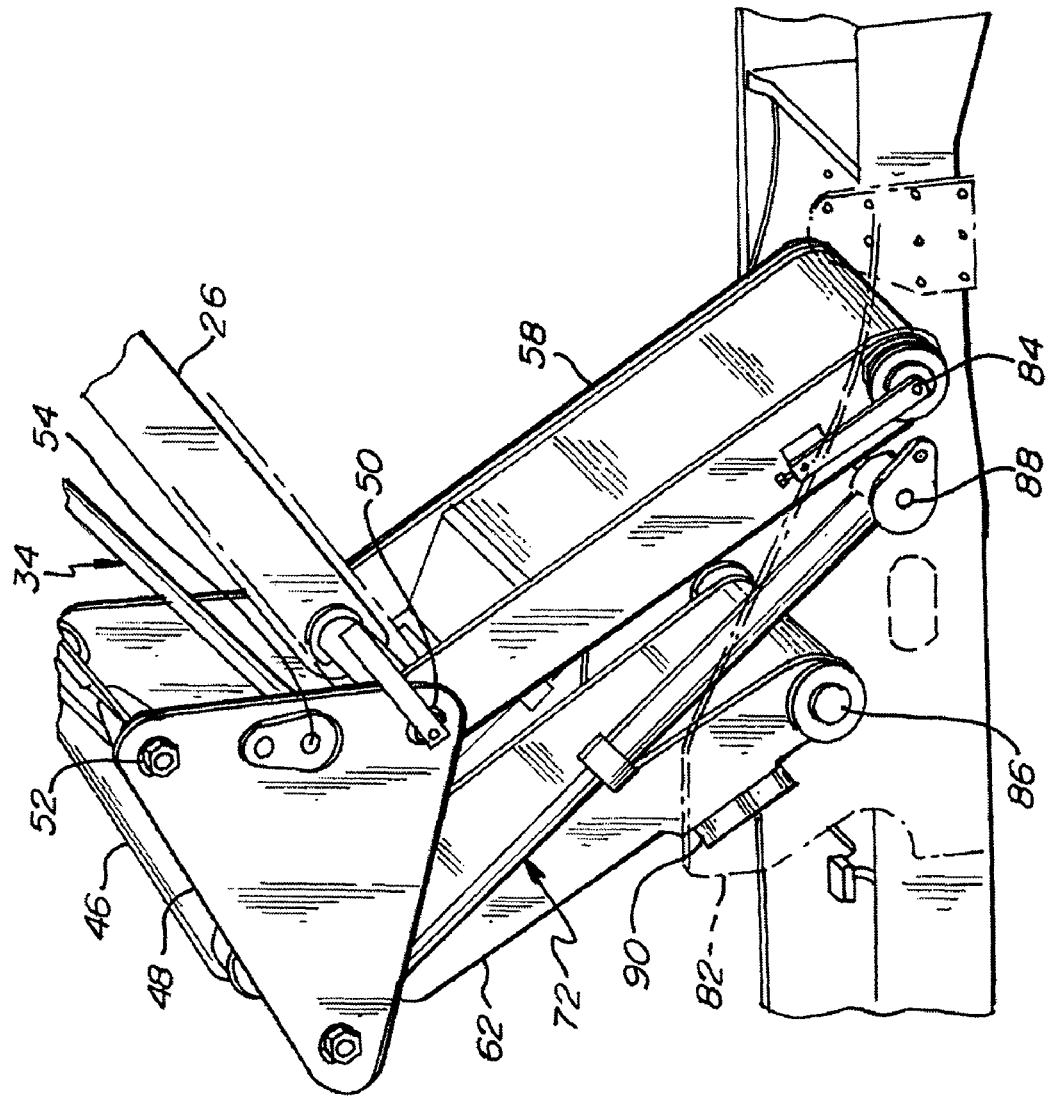
FIG. 12 is a perspective view of a portion of the cab assembly of FIG. 2, showing the pair of pivot plates, a portion of the cab assembly mounting framework, and portions of the links connected to the mounting framework.

As shown in FIGS. 10-12, a pad 90 is located on upper framework link 62, at the end proximate to mounting framework 78. When the cab 22 is in a fully raised position, the pad 90 will rest against stop plate 92, which is a part of the mounting framework 78. This provides the upper framework link 62 with a cushioned stop, which also has the effect of reducing vibrations felt by the operator when the cab is in a fully raised position.

The operation of the present invention may be appreciated by studying FIGS. 1-5.

Figure 2:
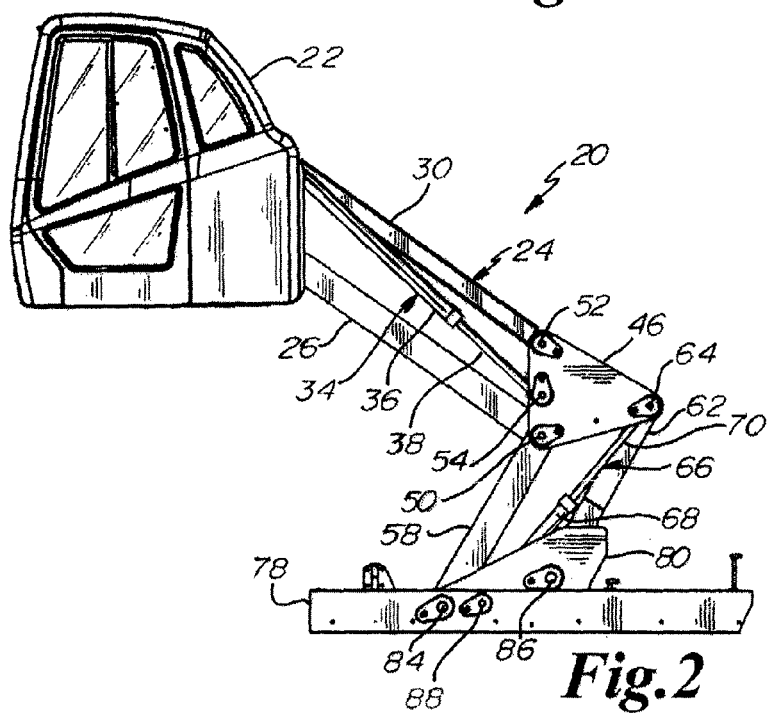
FIG. 2 is a side elevational view of the cab assembly of FIG. 1, wherein the cab assembly is not attached to the body of an excavator.
Figure 3:
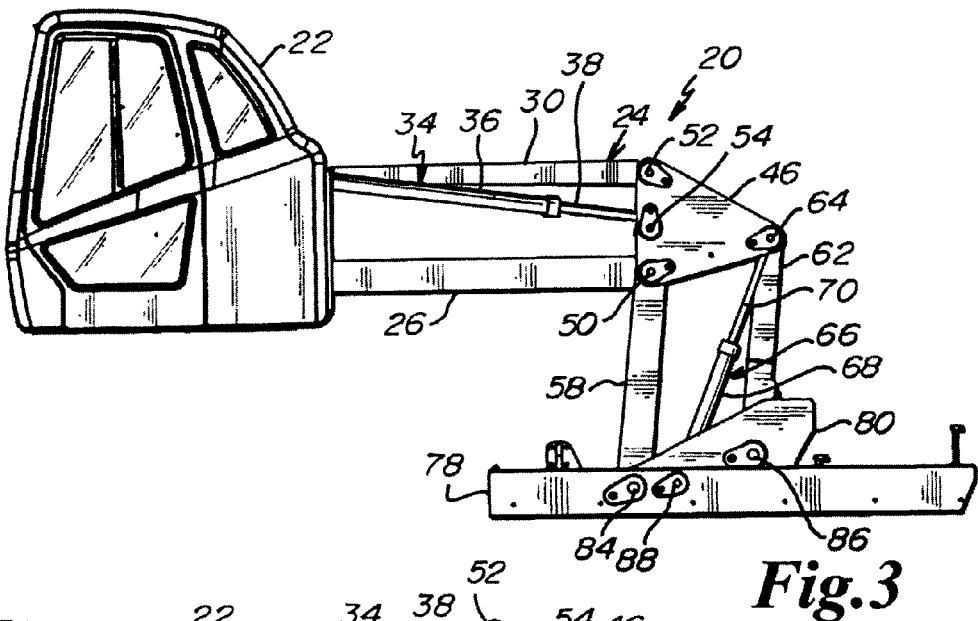
FIG. 3 is a side elevational view of the cab assembly of FIG. 2, wherein the cab is depicted in an intermediate position between the fully raised position and the fully lowered position.
Figure 4:
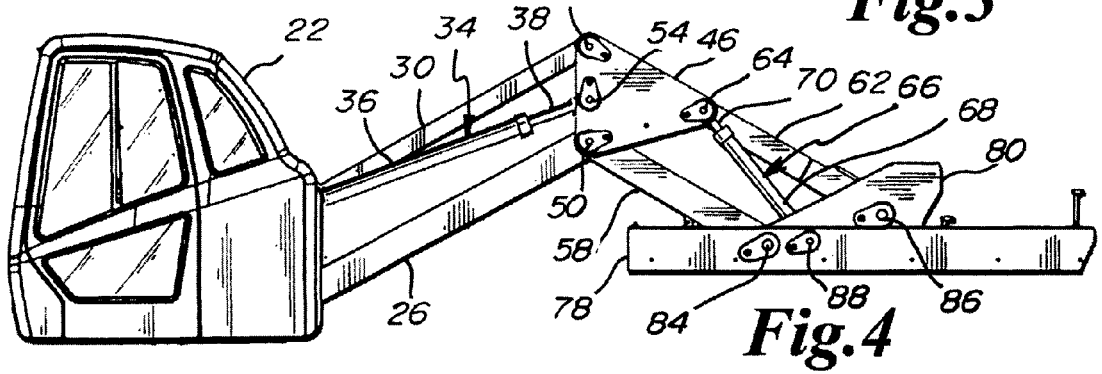
FIG. 4 is a side elevational view of the cab assembly of FIG. 2, wherein the cab is depicted in an intermediate position between the fully raised position and the fully lowered position.

FIG. 2 shows the cab assembly 20 when the cab 22 is at a fully raised position. In this position, the cab hydraulic cylinders 34, 40 and framework hydraulic cylinders 66, 72 are at a maximum extension (i.e. fully extended). When the framework hydraulic cylinders are retracted, the pivot plates 46, 48 are moved forwardly without rotation of the pivot plates. The forward motion of the pivot plates 46, 48 upon retraction of the framework hydraulic cylinders 66, 72 is shown in FIGS. 2-4. As the pivot plates 46, 48 move forward, the framework hydraulic cylinders 66, 72 and the framework links 58, 62 pivot forward.

When the cab hydraulic cylinders 34, 40 are retracted, the cab 22 is lowered in relation to the pivot plates 46, 48, from an elevated operating position to a ground level access position. The downward motion of the cab 22 upon retraction of the cab hydraulic cylinders 34, 40 is shown in FIGS. 2-5. As the cab 22 moves downward, the cab hydraulic cylinders 34, 40 and the cab links 26, 30 pivot in a downward direction. Therefore, in FIG. 2, the cab hydraulic cylinders 34, 40 and the cab links 26, 30 extend upwardly in relation to the pivot plates 46, 48, while in FIGS. 4 and 5, the cab hydraulic cylinders and cab links extend downwardly in relation to the pivot plates 46, 48.

Figure 5:
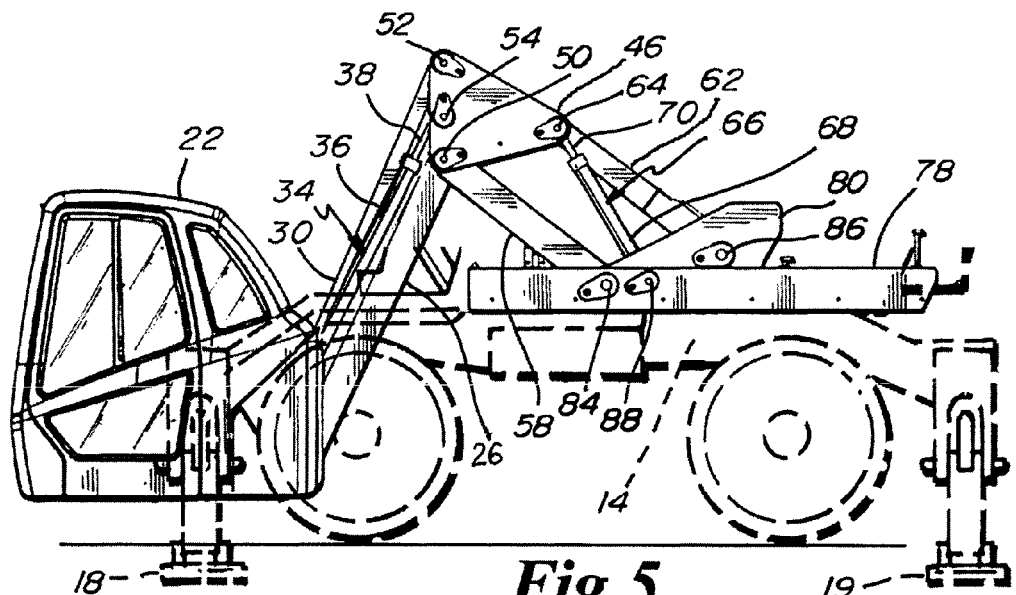
FIG. 5 is a side elevational view of the cab assembly of FIG. 2, wherein the cab is depicted in a fully lowered position. A portion of the excavator to which the cab assembly is attached is depicted in broken lines.

FIG. 5 shows the cab assembly 20 when the cab 22 is at a fully lowered position. In this position, the cab hydraulic cylinders 34, 40 and framework hydraulic cylinders 66, 72 are at a minimum extension (i.e. fully retracted).

The substantially parallel placement of cab links 26, 30 in relation to each other, and the substantially parallel placement of framework links 58, 62 in relation to each other, aid in preventing the cab 22 from tilting forward and backward while the cab is being moved between different positions. The use of stabilizing boom links as the cab links 26, 30 and the framework links 58, 62 improves the stability of the cab assembly 20, and also helps to prevent the cab from tilting.

The excavator may be operated when the cab is in various raised positions. Therefore, an operator may adjust the position of the cab to achieve a more favorable vantage point. However, for safety reasons, the cab assembly preferably includes a safety mechanism that prevents the excavator from being operated when the base of the cab is below the base of the upper rotating platform of the excavator. The cab is preferably mounted to the upper rotating platform, and therefore the cab rotates along with the upper rotating platform. Therefore, if the excavator is allowed to operate when the cab is below the base of the upper rotating platform, the cab could contact the wheels or supporting undercarriage of the excavator if the upper rotating platform is rotated while the cab is in a lowered position.

The cab assembly preferably includes a safety mechanism that allows the cab to be lowered if the excavator engine stops when the cab is still in an elevated position. The safety mechanism may function by releasing fluid from the cab and framework hydraulic cylinders, causing the hydraulic cylinders to retract, thereby lowering the cab to the ground.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

The invention claimed is:

1. An articulating cab assembly comprising:
   (a) a cab coupled to a pivot plate, wherein the pivot plate is coupled to a cab assembly mounting framework;
   (b) a cab extendable link having a first end and a second end, wherein the first end of the cab extendable link is pivotally connected to the cab, and the second end of the cab extendable link is pivotally connected to the pivot plate; and,
   (c) a framework extendable link having a first end and a second end, wherein the first end of the framework extendable link is pivotally connected to the pivot plate, and the second end of the framework extendable link is pivotally connected to the cab assembly mounting framework; wherein the cab is movable between a fully lowered position, wherein the cab extendable link and the framework extendable link are each at a minimum extension, and a fully raised position, wherein the cab extendable link and the framework extendable link are each at a maximum extension.

2. The articulating cab assembly of claim 1, further comprising:
   (a) a lower cab link having a first end and a second end, wherein the first end of the lower cab link is pivotally connected to the cab, and the second end of the lower cab link is pivotally connected to the pivot plate;
   (b) an upper cab link having a first end and a second end, wherein the first end of the upper cab link is pivotally connected to the cab, and the second end of the upper cab link is pivotally connected to the pivot plate;
   (c) a lower framework link having a first end and a second end, wherein the first end of the lower framework link is pivotally connected to the pivot plate, and the second end of the lower framework link is pivotally connected to the cab assembly mounting framework; and,
   (d) an upper framework link having a first end and a second end, wherein the first end of the upper framework link is pivotally connected to the pivot plate, and the second end of the upper framework link is pivotally connected to the cab assembly mounting framework.

3. The articulating cab assembly of claim 2, wherein the first end of the upper cab link is connected to the cab by an upper cab link-cab pivot pin, and the second end of the upper cab link is connected to the pivot plate by an upper cab link-pivot plate pivot pin; and,
   wherein the first end of the lower cab link is connected to the cab by a lower cab link-cab pivot pin, and the second end of the lower cab link is connected to the pivot plate by a lower cab link-pivot plate pivot pin.

4. The articulating cab assembly of claim 1, wherein the first end of the cab extendable link is connected to the cab by an upper cab link-cab pivot pin, and the second end of the cab extendable link is connected to the pivot plate by a cab extendable link-pivot plate pivot pin.

5. The articulating cab assembly of claim 2, wherein the first end of the lower framework link is connected to the pivot plate by a lower cab link-pivot plate pivot pin, and the second end of the lower framework link is connected to the cab assembly mounting framework by a lower framework link-framework pivot pin; and,
   wherein the first end of the upper framework link is connected to the pivot plate by an upper framework link-pivot plate pivot pin, and the second end of the upper framework link is connected to the cab assembly mounting framework by an upper framework link-framework pivot pin.

6. The articulating cab assembly of claim 1, wherein the first end of the framework extendable link is connected to the pivot plate by an upper framework link-pivot plate pivot pin, and the second end of the framework extendable link is connected to the cab assembly mounting framework by a framework extendable link-framework pivot pin.

7. The articulating cab assembly of claim 1, wherein the cab extendable link and the framework extendable link are hydraulic cylinders.

8. An articulating cab assembly comprising:
   (a) a cab coupled to a pair of pivot plates, wherein the pair of pivot plates is coupled to a cab assembly mounting framework;
   (b) a pair of cab extendable links, wherein each cab extendable link of the pair of cab extendable links has a first end and a second end, wherein the first end of each cab extendable link is pivotally connected to the cab, and the second end of each cab extendable link is pivotally connected to the pair of pivot plates; and,
   (c) a pair of framework extendable links, wherein each framework extendable link of the pair of framework extendable links has a first end and a second end, wherein the first end of each framework extendable link is pivotally connected to the pair of pivot plates, and the second end of each framework extendable link is pivotally connected to the cab assembly mounting frame; wherein the cab is movable between a fully lowered position, wherein each cab extendable link and each framework extendable link is at a minimum extension, and a fully raised position, wherein each cab extendable link and each framework extendable link is at a maximum extension.

9. The articulating cab assembly of claim 8, further comprising:
(a) a lower cab link having a first end and a second end, wherein the first end of the lower cab link is pivotally connected to the cab, and the second end of the lower cab link is pivotally connected to the pair of pivot plates;
(b) an upper cab link having a first end and a second end, wherein the first end of the upper cab link is pivotally connected to the cab, and the second end of the upper cab link is pivotally connected to the pair of pivot plates;
(c) a lower framework link having a first end and a second end, wherein the first end of the lower framework link is pivotally connected to the pair of pivot plates, and the second end of the lower framework link is pivotally connected to the cab assembly mounting framework; and,
(d) an upper framework link having a first end and a second end, wherein the first end of the upper framework link is pivotally connected to the pair of pivot plates, and the second end of the upper framework link is pivotally connected to the cab assembly mounting framework.

10. The articulating cab assembly of claim 9, wherein the first end of the upper cab link is connected to the cab by an upper cab link-cab pivot pin, and the second end of the upper cab link is connected to the pair of pivot plates by an upper cab link-pivot plate pivot pin; and,
wherein the first end of the lower cab link is connected to the cab by a lower cab link-cab pivot pin, and the second end of the lower cab link is connected to the pair of pivot plates by a lower cab link-pivot plate pivot pin.

11. The articulating cab assembly of claim 8, wherein the first end of each cab extendable link is connected to the cab by an upper cab link-cab pivot pin, and the second end of each cab extendable link is connected to the pair of pivot plates by a cab extendable link-pivot plate pivot pin.

12. The articulating cab assembly of claim 9, wherein the first end of the lower framework link is connected to the pair of pivot plates by a lower cab link-pivot plate pivot pin, and the second end of the lower framework link is connected to the cab assembly mounting framework by a lower framework link-framework pivot pin; and,
wherein the first end of the upper framework link is connected to the pair of pivot plates by an upper framework link-pivot plate pivot pin, and the second end of the upper framework link is connected to the cab assembly mounting framework by an upper framework link-framework pivot pin.

13. The articulating cab assembly of claim 8, wherein the first end of each framework extendable link is connected to the pair of pivot plates by an upper framework link-pivot plate pivot pin, and the second end of each framework extendable link is connected to the cab assembly mounting framework by a framework extendable link-framework pivot pin.

14. The articulating cab assembly of claim 9, wherein the lower and upper framework links and the lower and upper cab links are stabilizing boom links.

15. The articulating cab assembly of claim 8, wherein each cab extendable link and each framework extendable link is a hydraulic cylinder.

16. An articulating cab assembly for an excavator, backhoe or crane having an elevated frame, comprising:
(a) a cab assembly mounting framework fixedly mounted to the elevated frame of the excavator;
(b) upwardly extending lower and upper framework links pivotally mounted to the framework and a pivot plate;
(c) a framework extendable link pivotally mounted to the framework and the pivot plate for moving the pivot plate forwardly and rearwardly without pivot plate rotation;
(d) upwardly and downwardly extending lower and upper cab links pivotally mounted to the pivot plate and a rear portion of a cab; and
(e) a cab extendable link pivotally mounted to the pivot plate and the rear portion of the cab for moving the cab between an elevated operating position and a lower ground level operator load and unload access position.

17. The articulating cab assembly of claim 16, wherein a first end of the lower framework link is connected to the pivot plate by a lower cab link-pivot plate pivot pin, and a second end of the lower framework link is connected to the cab assembly mounting framework by a lower framework link-framework pivot pin.

18. The articulating cab assembly of claim 16, wherein a first end of the upper framework link is connected to the pivot plate by an upper framework link-pivot plate pivot pin, and a second end of the upper framework link is connected to the cab assembly mounting framework by an upper framework link-framework pivot pin.

19. The articulating cab assembly of claim 16, wherein a first end of the framework extendable link is connected to the pivot plate by an upper framework link-pivot plate pivot pin, and a second end of the framework extendable link is connected to the cab assembly mounting framework by a framework extendable link-framework pivot pin.

20. The articulating cab assembly of claim 16, wherein a first end of the upper cab link is connected to the cab by an upper cab link-cab pivot pin, and a second end of the upper cab link is connected to the pivot plate by an upper cab link-pivot plate pivot pin.

21. The articulating cab assembly of claim 16, wherein a first end of the lower cab link is connected to the cab by a lower cab link-cab pivot pin, and a second end of the lower cab link is connected to the pivot plate by a lower cab link-pivot plate pivot pin.

22. The articulating cab assembly of claim 16, wherein a first end of the cab extendable link is connected to the cab by an upper cab link-cab pivot pin, and a second end of the upper extendable link is connected to the pivot plate by a cab extendable link-pivot plate pivot pin.

23. The articulating cab assembly of claim 16, wherein the lower and upper framework links and the lower and upper cab links are stabilizing boom links.

24. The articulating cab assembly of claim 16, wherein the framework extendable link and the cab extendable link are hydraulic cylinders.

25. The articulating cab assembly of claim 16, wherein the lower and upper framework links and the framework extendable link are pivotally mounted to a pair of pivot plates, and wherein the lower and upper cab links and the cab extendable link are pivotally mounted to the pair of pivot plates.

* * * * *